United States Patent
Bambila et al.

(10) Patent No.: US 12,540,862 B2
(45) Date of Patent: Feb. 3, 2026

(54) RESISTANCE TEMPERATURE DETECTOR (RTD) SENSOR-BASED FAULT STATUS REPORTING FOR A POSITIVE TEMPERATURE COEFFICIENT (PTC) HEATER

(71) Applicant: Goodrich Corporation, Charlotte, NC (US)

(72) Inventors: Gururaja Bambila, Karnataka (IN); Manjunath Hiremath, Karnataka (IN); Rhushikesh Patil, Bangalore (IN); Srinivas Magaji Gundu, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 472 days.

(21) Appl. No.: 18/305,972

(22) Filed: Apr. 24, 2023

(65) Prior Publication Data
US 2024/0264007 A1    Aug. 8, 2024

(30) Foreign Application Priority Data

Feb. 2, 2023   (IN) .............................. 202311006749

(51) Int. Cl.
*G01K 7/18*   (2006.01)
*G01K 7/16*   (2006.01)

(52) U.S. Cl.
CPC ....... *G01K 7/183* (2013.01); *G01K 2007/163* (2013.01)

(58) Field of Classification Search
CPC .................. G01K 7/183; G01K 2007/163
USPC ........................................................ 324/525
See application file for complete search history.

(56) References Cited

U.S. PATENT DOCUMENTS

| 8,244,427 B2 | 8/2012 | Weiss et al. | |
|---|---|---|---|
| 10,184,689 B2 | 1/2019 | Faulkner | |
| 2004/0086023 A1* | 5/2004 | Smith | G01K 1/08 374/141 |
| 2010/0280788 A1* | 11/2010 | Bohan | G01K 7/42 374/107 |
| 2021/0153305 A1 | 5/2021 | Boegershausen et al. | |
| 2021/0270471 A1 | 9/2021 | Hayden et al. | |

FOREIGN PATENT DOCUMENTS

| CN | 102261969 A | 11/2011 |
|---|---|---|
| CN | 108955917 A | 12/2018 |
| JP | H11251037 A | 9/1999 |

(Continued)

OTHER PUBLICATIONS

Search Report issued in European Patent Application No. 24152163.2; Application Filing Date Jan. 16, 2024; Date of Mailing Jul. 11, 2024 (9 pages).

*Primary Examiner* — Stephanie E Bloss
*Assistant Examiner* — Michael A Harrison
(74) *Attorney, Agent, or Firm* — CANTOR COLBURN LLP

(57) ABSTRACT

A positive temperature coefficient (PTC) heater apparatus is provided. The PTC heater apparatus includes a PTC heater, a resistance temperature detector (RTD) sensor mounted to the PTC heater and a controller logic unit electrically connected to the RTD sensor to receive readings of the RTD sensor, which, when the PTC heater is powered on, indicate whether the PTC heater is faulty.

12 Claims, 6 Drawing Sheets

(56) References Cited

FOREIGN PATENT DOCUMENTS

| KR | 102348172 B1 | 1/2022 |
|----|--------------|--------|
| WO | 2020180273 A1 | 9/2020 |
| WO | 2021195304 A1 | 9/2021 |

* cited by examiner

RESISTANCE TEMPERATURE DETECTOR (RTD) SENSOR-BASED FAULT STATUS REPORTING FOR A POSITIVE TEMPERATURE COEFFICIENT (PTC) HEATER

CROSS-REFERENCE TO RELATED APPLICATIONS

This application claims the benefit of Indian Patent Application No. 202311006749 filed Feb. 2, 2023, the disclosure of which is incorporated herein by reference in its entirety.

BACKGROUND

The present disclosure relates to fault reporting for a positive temperature coefficient heater (PTC) and, in particular, to resistance temperature detector (RTD) sensor-based fault reporting apparatus and method for a PTC heater.

In aerospace technologies, there is often a requirement to adopt, in a water and waste system of an aircraft for example, a simplified freeze protection heater that can be self-regulated and that has a lightweight and thin construction. A PTC element-based heater has an inherent property of self-regulated heating operation, overheat protection and overload protection. However, with PTC heaters, fault status detection and reporting are still needed and provided by an external device. The fault reporting feature in particular is a mandated requirement for component and/or system health status.

Currently, existing external controllers for use with PTC heaters tend to be large and costly. Their control logic is often incompatible with PTC element-based heaters. Thus, there is a need for a PTC heater that does not require an external controller or device for fault detection and reporting.

BRIEF DESCRIPTION

According to an aspect of the disclosure, a positive temperature coefficient (PTC) heater apparatus is provided. The PTC heater apparatus includes a PTC heater, a resistance temperature detector (RTD) sensor mounted to the PTC heater and a controller logic unit electrically connected to the RTD sensor to receive readings of the RTD sensor, which, when the PTC heater is powered on, indicate whether the PTC heater is faulty.

In accordance with additional or alternative embodiments, the PTC heater includes dielectric layers, a first conducting trace comprising a first conducting trace portion interposed between the dielectric layers, a second conducting trace comprising a second conducting trace portion interposed between the dielectric layers and PTC heating patches, each being electrically connected between the first and second conducting trace portions and interposed between the dielectric layers.

In accordance with additional or alternative embodiments, the RTD sensor is mounted to an exterior face of one of the dielectric layers.

In accordance with additional or alternative embodiments, an insulating layer is disposed about the RTD sensor at the exterior face of the one of the dielectric layers.

In accordance with additional or alternative embodiments, the PTC heater is maintained at an initial temperature and powered on at that initial temperature, a temperature of the PTC heater increases once the PTC heater is powered on and a signal from the RTD sensor triggers a timer in the controller logic unit to begin timing an RTD sensing duration of a predefined length of time once the temperature of the PTC heater increases beyond a predefined threshold temperature range.

In accordance with additional or alternative embodiments, the controller logic unit establishes a predefined range of temperatures and the controller logic unit indicates that the PTC heater is faulty in an event the readings of the RTD sensor indicate that a temperature of the PTC heater is outside the predefined range of temperatures and the timer indicates that the predefined length of time passed.

In accordance with additional or alternative embodiments, the controller logic unit includes a resistive network filter, which is receptive of a voltage supply and the readings of the RTD sensor, and which outputs a differential signal corresponding to a change in temperature of the PTC heater, a difference amplifier, which is receptive of a voltage supply, and which amplifies the differential signal of the resistive network filter and a multiplexer with an astable timer, which is receptive of multiple signals from the difference amplifier, and which is configured to select one of the multiple signals for analysis by the controller logic unit.

According to an aspect of the disclosure, a positive temperature coefficient (PTC) heater apparatus is provided and includes a PTC heater, multiple resistance temperature detector (RTD) sensors, each of which is mounted to the PTC heater, and a controller logic unit electrically connected to each of the multiple RTD sensors to receive readings of each of the multiple RTD sensors, which, when the PTC heater is powered on, respectively indicate whether the PTC heater is faulty.

In accordance with additional or alternative embodiments, the PTC heater includes dielectric layers, a first conducting trace comprising a first conducting trace portion interposed between the dielectric layers, a second conducting trace comprising a second conducting trace portion interposed between the dielectric layers and PTC heating patches, each being electrically connected between the first and second conducting trace portions and interposed between the dielectric layers.

In accordance with additional or alternative embodiments, each of the multiple RTD sensors is mounted to an exterior face of one of the dielectric layers.

In accordance with additional or alternative embodiments, an insulating layer is disposed about each of the multiple RTD sensors at the exterior face of the one of the dielectric layers.

In accordance with additional or alternative embodiments, the PTC heater is maintained at an initial temperature and powered on at that initial temperature, a temperature of the PTC heater increases once the PTC heater is powered on and a signal from any one of the multiple RTD sensors triggers a timer in the controller logic unit to begin timing an RTD sensing duration of a predefined length of time once the temperature of the PTC heater increases beyond a predefined threshold temperature range.

In accordance with additional or alternative embodiments, the controller logic unit establishes a predefined range of temperatures and the controller logic unit indicates that the PTC heater is faulty in an event the readings of any one of the multiple RTD sensors indicate that a temperature of the PTC heater is outside the predefined range of temperatures and the timer indicates that the predefined length of time passed.

In accordance with additional or alternative embodiments, the controller logic unit includes multiple resistive network filters, each of which is receptive of a voltage supply and the readings of a corresponding one of the multiple RTD sensors, and each of which outputs a differential signal corresponding to a change in temperature of the PTC heater, multiple difference amplifiers, each of which is receptive of a voltage supply, and each of which amplifies the differential signal of a corresponding one of the multiple resistive network filters and multiple multiplexers with astable timers, each of which is receptive of multiple signals from a corresponding one of the multiple difference amplifiers, and each of which is configured to select one of the multiple signals for analysis by the controller logic unit.

According to an aspect of the disclosure, a method of operating a positive temperature coefficient (PTC) heater apparatus in which a resistance temperature detector (RTD) sensor is mounted to a PTC heater is provided and includes maintaining the PTC heater at an initial temperature and powering the PTC heater on at the initial temperature, initiating a timer once readings of the RTD sensor indicate that a temperature of the PTC heater increases beyond a predefined threshold temperature range and indicating that the PTC heater is faulty in an event the readings of the RTD sensor indicate that the temperature of the PTC heater is outside a predefined range of temperatures and the timer indicates that a predefined length of time passed.

In accordance with additional or alternative embodiments, the method further includes insulating the RTD sensor from ambient temperatures.

In accordance with additional or alternative embodiments, the method further includes setting the initial temperature at about −55° C., setting the predefined threshold temperature range at about −35° C. to about −30° C. and setting the predefined range of temperatures at about 10° C. to about 80° C.

In accordance with additional or alternative embodiments, the indicating includes indicating that the PTC heater has at least one of an open circuit and insufficient power in an event the readings of the RTD sensor indicate that the temperature of the PTC heater is below the predefined range of temperatures and the timer indicates that the predefined length of time passed.

In accordance with additional or alternative embodiments, the indicating includes indicating that the PTC heater has at least one of a short circuit, negative temperature coefficient (NTC) behavior and damage in an event the readings of the RTD sensor indicate that the temperature of the PTC heater is above the predefined range of temperatures and the timer indicates that the predefined length of time passed.

In accordance with additional or alternative embodiments, multiple RTD sensors are mounted to the PTC heater, the initiating includes initiating a timer once readings of any one of the multiple RTD sensors indicate that a temperature of the PTC heater increases beyond a predefined threshold temperature range and the indicating includes indicating that the PTC heater is faulty in an event the readings of any one of the multiple RTD sensors indicate that the temperature of the PTC heater is outside a predefined range of temperatures and the timer indicates that a predefined length of time passed.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a PTC heater apparatus is provided in which an RTD temperature sensor is mounted on a PTC heater (multiple RTD temperature sensors can be provided for large PTC heaters). Controller logic will be packed in a separate enclosure (i.e., in a potted or metal case) that is connected to RTD sensor. A fault reporting device will be connected in line with the PTC heater. The PTC heater will be maintained at −55° C. ambient and powered on, at which point, the heater temperature will increase. The RTD temperature sensor resistance begins changing based on the temperature increase (or decrease). When the heater temperature crosses between a given temperature (e.g., −35° C. to −30° C.), a sensing signal from the RTD sensor will trigger a timer in the controller logic to indicate a good status for a set heating duration. The heating duration is set to avoid false heater fault reports during the ramp up of the heater from the −55° C. ambient and can be based on test data of multiple heaters with different power densities.

In some exemplary cases, the controller logic will report the good status when the temperature of the heater is between a given range of temperatures (e.g., 10° C. to 80° C.) after the heater is powered on and will report a fault status when the temperature of the heater is below the range, which is indicative of there being an open circuit incident or insufficient power due to PTC element damage. In other exemplary cases, the controller logic will report a fault status when the heater temperature is above the range, which is indicative of a short circuit, negative temperature coefficient (NTC) behavior or PTC property degradation.

Thus, the proposed fault reporting apparatus and method covers detections of failure modes such as heater open, insufficient power due to heating patch damage, heater short and heater resistance increase due to PTC property degradation.

Figure 1:
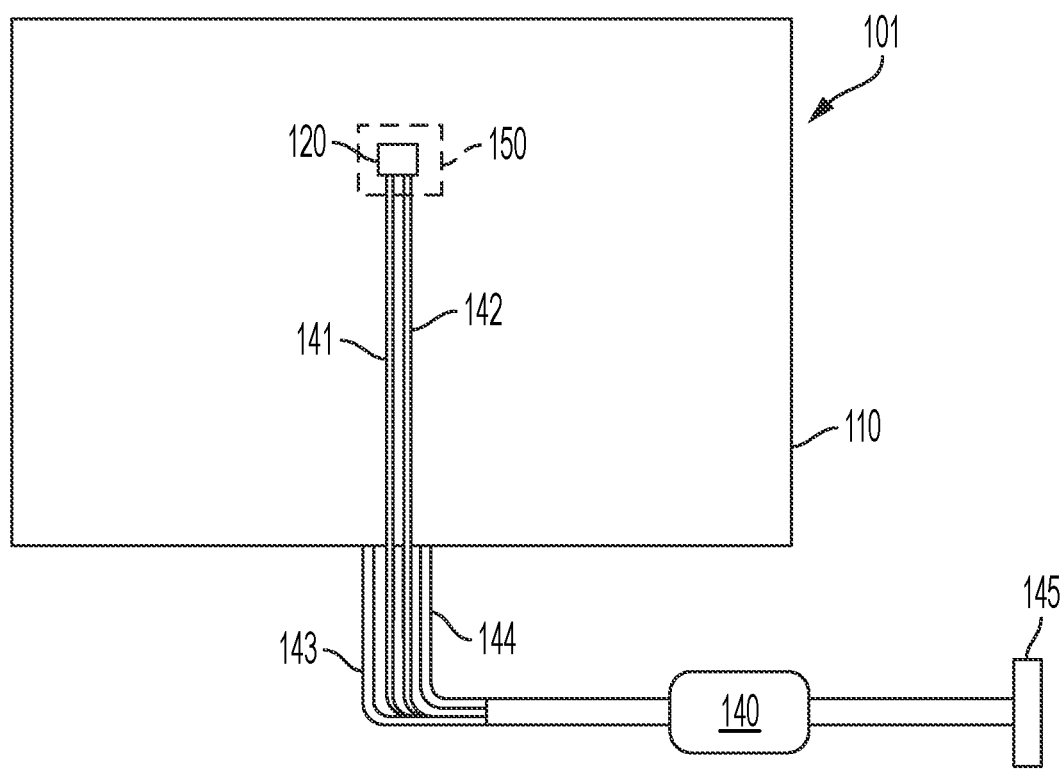
FIG. 1 is a top-down view of a PTC heater with one RTD sensor apparatus in accordance with embodiments.

With reference to FIG. 1, a PTC heater apparatus 101 is provided and includes a PTC heater 110, an RTD sensor 120 that is mounted to the PTC heater 110 and a controller logic unit 140. The controller logic unit 140 is electrically connected to at least the RTD sensor 120 and is configured to receive readings of the RTD sensor 120. The readings of the RTD sensor 120 can indicate whether the PTC heater 110 is faulty when the PTC heater 110 is powered on. A connector 145 can be connected to the controller logic unit 140 so that the controller logic unit 140 can be communicative with an external device (i.e., an external computing device and display).

Figure 2:
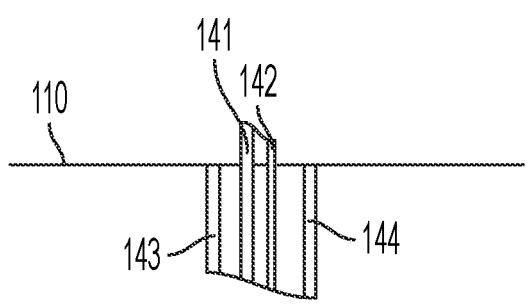
FIG. 2 is an enlarged view of the portion of FIG. 1 surrounded by dashed box 1 in accordance with embodiments.

With continued reference to FIG. 1 and with additional reference to FIG. 2, the controller logic unit 140 is electrically connected to the RTD sensor 120 by way of first and second conductive lines 141 and 142, which provide electrical output from the RTD sensor 120 to the controller logic unit 140. In addition, the controller logic unit 140 can be connected to the PTC heater 110 by a first "line" conductor 143 and by a second "return" conductor 144 which are the supply connections to the PTC heater 110.

Figure 3:
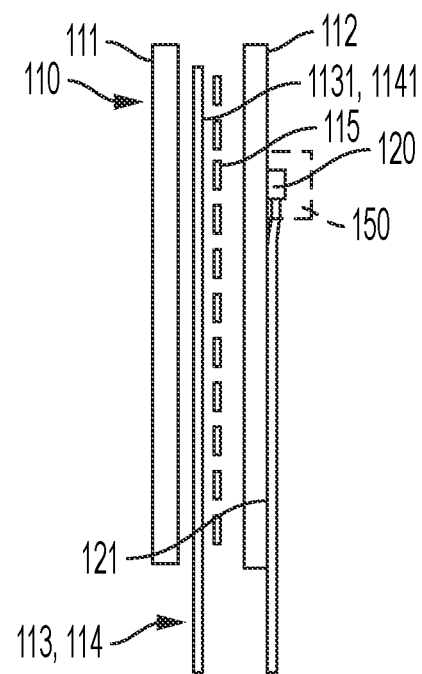
FIG. 3 is a side view of the PTC heater apparatus of FIG. 1 in accordance with embodiments.
Figure 4:
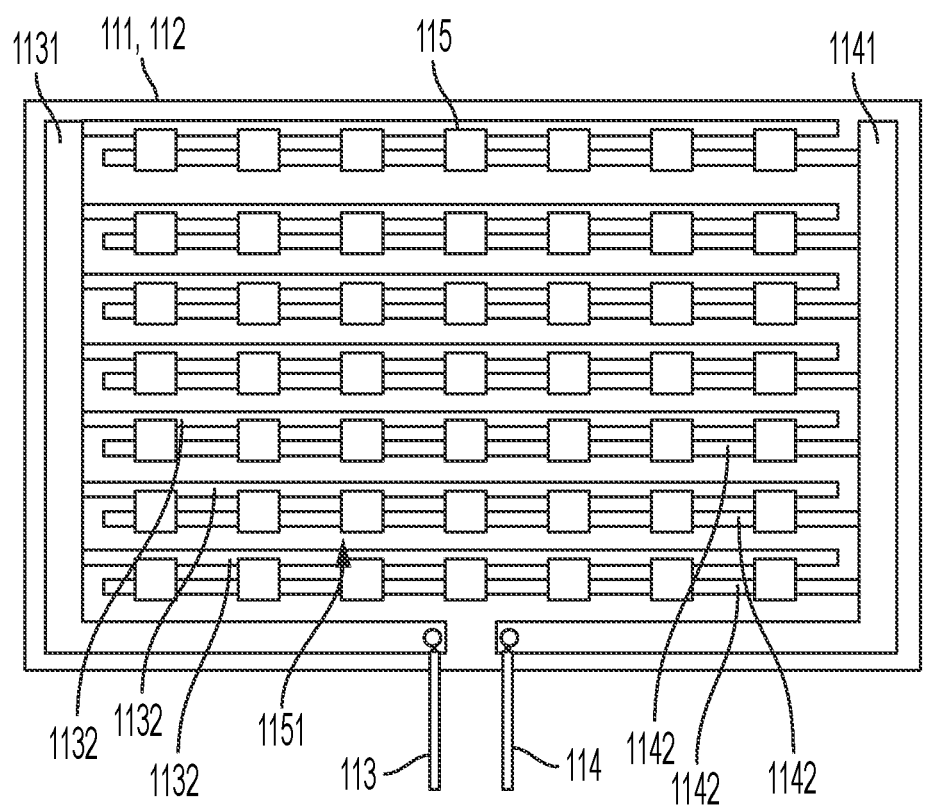
FIG. 4 is a top-down view of components of a PTC heater of the PTC heater apparatus of FIG. 1 in accordance with embodiments.

With continued reference to FIG. 1 and with additional reference to FIGS. 3 and 4, the PTC heater 110 includes first and second dielectric layers 111 and 112, which can include or be provided as thermoplastic, a first conducting trace 113, a second conducting trace 114 and PTC heating patches 115. The first conducting trace 113 includes a first conducting trace portion 1131, which is interposed between the first and second dielectric layers 111 and 112, and the second conducting trace 114 includes a second conducting trace portion 1141, which is interposed between the first and second dielectric layers 111 and 112. The PTC heating patches 115 are each electrically connected between the first and second conducting trace portions 1131 and 1141 and are each interposed between the first and second dielectric layers 111 and 112. Each of the PTC heating patches 115 can be formed of an electrical resistance heater material whose resistance increases significantly with temperature.

As shown in FIG. 3, the RTD sensor 120 can be mounted to an exterior face 121 of one of the first and second dielectric layers 111 and 112. Also, the PTC heater apparatus 101 can additionally include an insulating layer 150. The insulating layer 150 is disposed about the RTD sensor 120 at the exterior face 121.

As shown in FIG. 4, the first and second conducting trace portions 1131 and 1141 can be patterned along peripheral sides of the first and second dielectric layers 111 and 112 and can include first and second crossing traces 1132 and 1142 that extend across the first and second dielectric layers 111 and 112 in an interleaved formation. Each of the PTC heating patches 115 can be arranged in a lattice formation 1151 to electrically connect between proximal portions of the first and second crossing traces 1132 and 1142. With this configuration, voltage applied to the PTC heater 110 results in a generally uniform heating pattern in the absence of a fault in the PTC heater 110.

Figure 5:
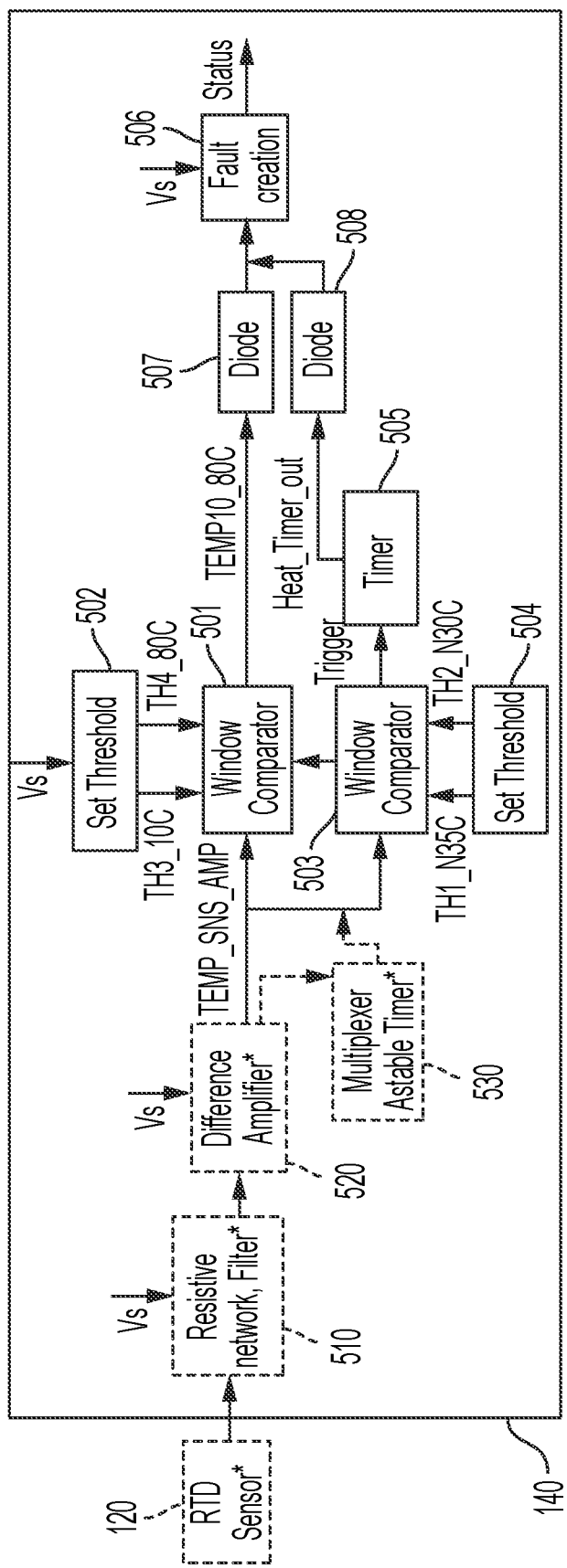
FIG. 5 is a schematic diagram of a controller logic unit of the PTC heater apparatus of FIG. 1.

With reference to FIG. 5, the controller logic unit 140 includes a first window comparator 501, a first threshold setting unit 502, which is receptive of a voltage supply and which sets a predefined range of temperatures for the first window comparator 501, a second window comparator 503 and a second threshold setting unit 504, which sets a predefined threshold temperature range for the second window comparator 503. The controller logic unit 140 further includes a timer 505 downstream from the second window comparator 503, a fault creation unit 506, which is receptive of a voltage supply, and first and second diodes 507 and 508. The first diode 507 is electrically interposed between the first window comparator 501 and the fault creation unit 506 and the second diode 508 is electrically interposed between the timer 505 and the fault creation unit 506.

In addition, as shown in FIG. 5, the controller logic unit 140 includes a resistive network filter 510, a difference amplifier 520 and a multiplexer with an astable timer 530. The resistive network filter 510 is receptive of a voltage supply and the readings of the RTD sensor 120. The resistive network filter 510 also outputs a differential signal that corresponds to a change in temperature of the PTC heater 110 (see FIG. 1). The difference amplifier 520 is receptive of a voltage supply and amplifies the differential signal of the resistive network filter 510. Outputs of the difference amplifier 520 are provided to the first and second window comparators 501 and 503. The multiplexer with the astable timer 530 is receptive of multiple signals from the difference amplifier 520 and is configured to select one of the multiple signals for analysis by the controller logic unit. An output of the multiplexer with the astable timer 530 is output to the first and second window comparators 501 and 503.

The following will describe an operation of the PTC heater apparatus 101 described above refers to various temperatures. These temperatures are exemplary and not intended to otherwise limit the scope of the application in any way.

In an operation of the PTC heater apparatus 101, with the controller logic unit 140 provided as described above, the PTC heater 110 is maintained at an initial temperature of about −55° C. and is powered on at that initial temperature. The temperature of the PTC heater 110 increases once the PTC heater 110 is powered on. A signal from the RTD sensor 120 triggers the timer 505 to begin timing an RTD sensing duration of a predefined length of time, such as five minutes or five seconds, for example, once the temperature of the PTC heater 110 increases beyond the predefined threshold temperature range of about −35° C. to about −30° C. as set by the second threshold setting unit 504. The controller logic unit 140 is configured to establish the predefined range of temperatures, such as about 10° C. to about 80° C. as set by the first threshold setting unit 502.

The controller logic unit 140 is further configured to indicate that the PTC heater 110 is faulty (i.e., in a faulty condition) in an event the readings of the RTD sensor 120 indicate that a temperature of the PTC heater 110 is outside the predefined range of temperatures and the timer indicates that the predefined length of time passed. In greater detail, the controller logic unit 140 can indicate that the PTC heater 110 has at least one of an open circuit and insufficient power in an event the readings of the RTD sensor 120 indicate that the temperature of the PTC heater 110 is below the predefined range of temperatures (i.e., below about 10° C.) and the timer 505 indicates that the predefined length of time passed. Conversely, the controller logic unit 140 can indicate that the PTC heater 110 has at least one of a short circuit, negative temperature coefficient (NTC) behavior and damage in an event the readings of the RTD sensor 120 indicate that the temperature of the PTC heater 110 is above the predefined range of temperatures (i.e., above about 80° C.) and the timer 505 indicates that the predefined length of time passed.

Figure 6:
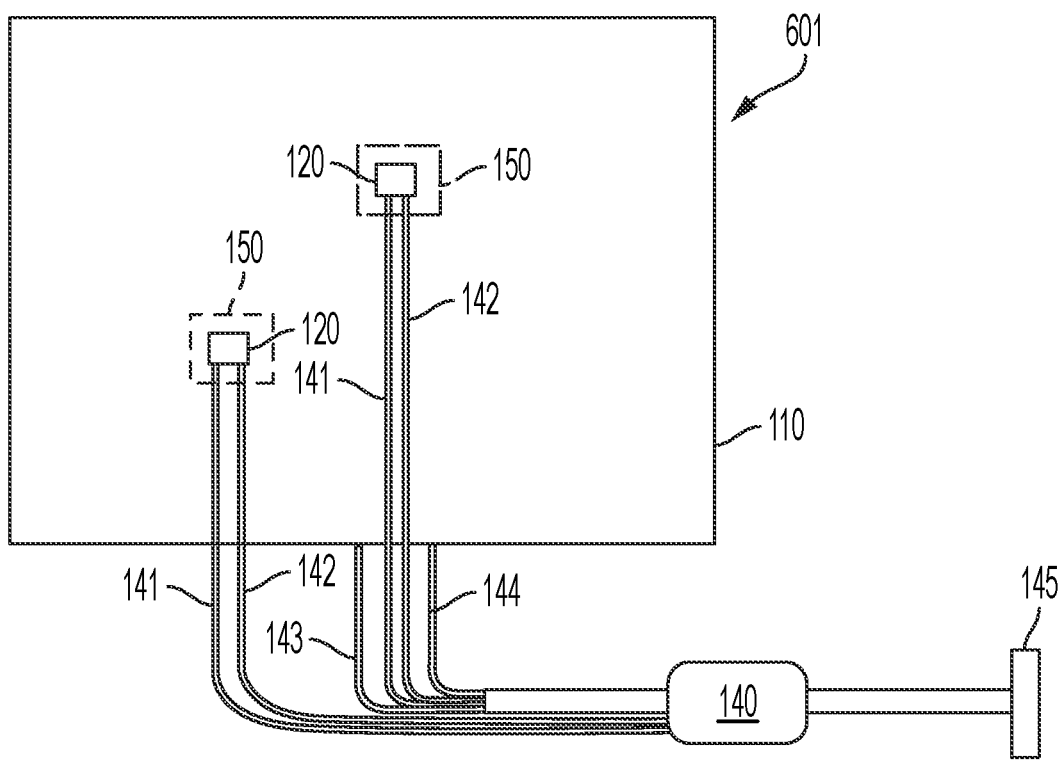
FIG. 6 is a top-down view of a PTC heater apparatus with multiple RTD sensors in accordance with embodiments.

With reference to FIG. 6, a PTC heater apparatus 601 is provided and includes similar features as the PTC heater apparatus 101 of FIG. 1 except that multiple resistance temperature detector (RTD) sensors 120 are mounted to the PTC heater 110 and the controller logic unit 140 is electrically connected to each of the multiple RTD sensors 120 to receive readings of each of the multiple RTD sensors 120, which, when the PTC heater 110 is powered on, respectively indicate whether the PTC heater 110 is faulty. Though not specifically shown in FIGS. 5 and 6, in the PTC heater apparatus 601 of FIG. 6, the controller logic unit 140 can include, but is not required to include, multiple resistive network filters 510, multiple difference amplifiers 520 and multiple multiplexer with the astable timers 530 (see FIG. 5). The multiple resistive network filters 510, the multiple difference amplifiers 520 and the multiple multiplexers with the astable timers 530 operate similarly as described above for each of the multiple RTD sensors 120.

In accordance with embodiments, there can be RTD sensors 120 of multiple number like 1, 2, 4, 8, etc. depending on heater size and requirements to increase the sensing area. For example, if there are two RTD sensors 120 in a large PTC heater 110, there can be two resistive network filters 510, two difference amplifiers 520 and one multiplexer (4:1) with one astable timer 530.

Figure 7:
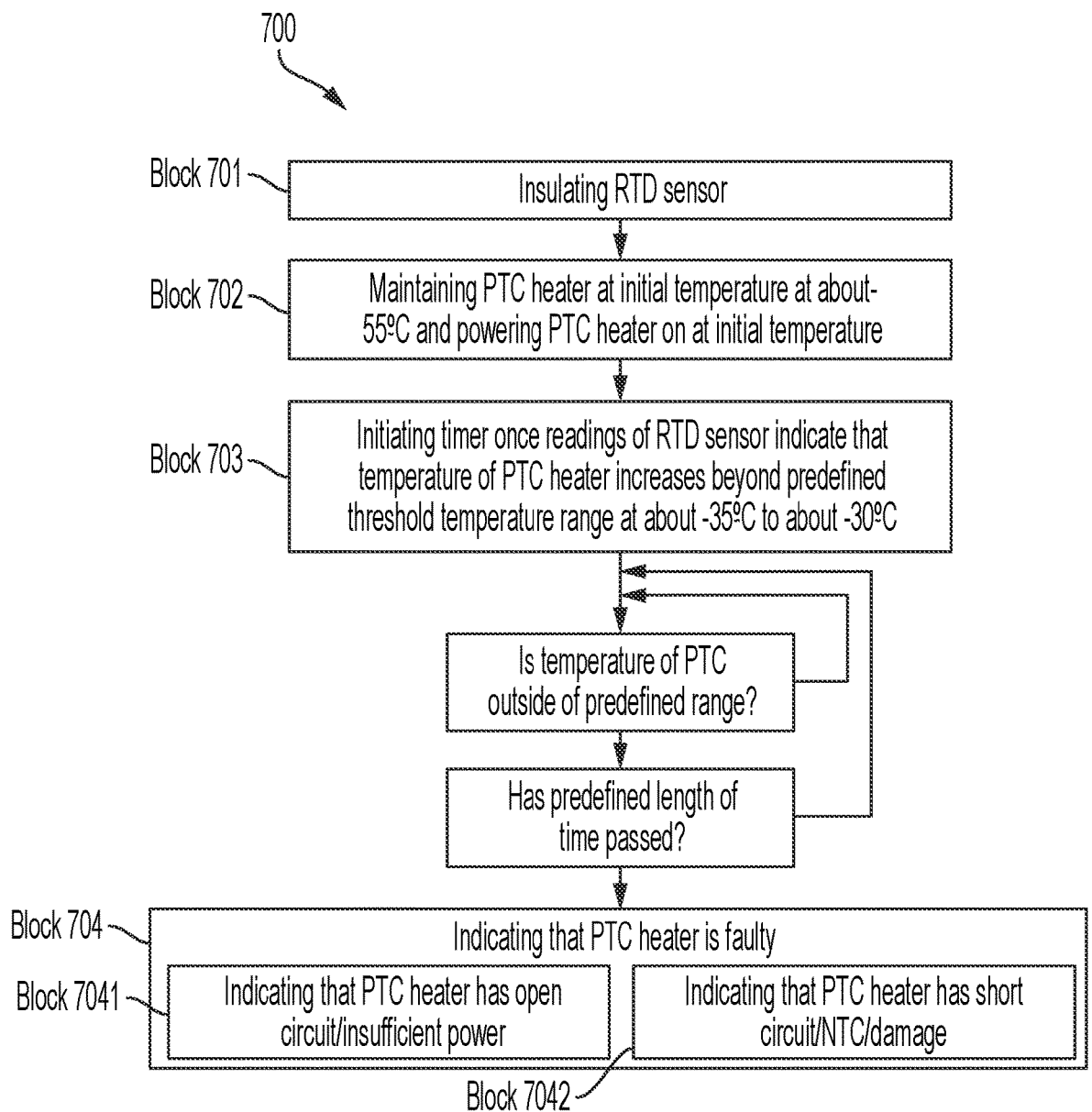
FIG. 7 is a flow diagram illustrating a method of operating a positive temperature coefficient (PTC) heater apparatus in accordance with embodiments.

With reference to FIG. 7, a method 700 of operating a PTC heater apparatus, in which an RTD sensor is mounted to a PTC heater as described above (or in which multiple RTD sensors are mounted to a PTC heater), is provided. As shown in FIG. 7, the method 700 includes insulating the RTD sensor from ambient temperatures (block 701), maintaining the PTC heater at an initial temperature at about −55° C. and powering the PTC heater on at the initial temperature (block 702), initiating a timer once readings of the RTD sensor indicate that a temperature of the PTC heater increases beyond a predefined threshold temperature range at about −35° C. to about −30° C. (block 703) and indicating that the PTC heater is faulty in an event the readings of the RTD sensor indicate that the temperature of the PTC heater is outside a predefined range of temperatures, which are set at about 10° C. to about 80° C., and the timer indicates that a predefined length of time passed (block 704). In accordance with embodiments, the indicating of block 704 can include indicating that the PTC heater has at least one of an open circuit and insufficient power in an event the readings of the RTD sensor indicate that the temperature of the PTC heater is below the predefined range of temperatures and the timer indicates that the predefined length of time passed (block 7041) or indicating that the PTC heater has at least one of a short circuit, negative temperature coefficient (NTC) behavior and damage in an event the readings of the RTD sensor indicate that the temperature of the PTC heater is above the predefined range of temperatures and the timer indicates that the predefined length of time passed (block 7042).

Technical effects and benefits of the present disclosure are the provision of an RTD temperature sensor mounted on a PTC heater to provide fault detection and reporting that meets requirements in a simple, cost effective and non-programmed manner. The RTD temperature sensor can be generic to any type of PTC heater, such that no configuration or re-configuration of the PTC heater or the RTD temperature sensor is required. The mounting of the RTD temperature sensor can be relatively easily adopted for multiple sensing inputs for a large PTC heater.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A positive temperature coefficient (PTC) heater apparatus, comprising:
   a PTC heater;
   a resistance temperature detector (RTD) sensor mounted to the PTC heater; and
   a controller logic unit electrically connected to the RTD sensor to receive readings of the RTD sensor, which, when the PTC heater is powered on, indicate whether the PTC heater is faulty,
   wherein the PTC heater comprises:
   dielectric layers;
   a first conducting trace comprising a first conducting trace portion interposed between the dielectric layers;
   a second conducting trace comprising a second conducting trace portion interposed between the dielectric layers; and
   PTC heating patches, each being electrically connected between the first and second conducting trace portions and interposed between the dielectric layers.

2. The PTC heater apparatus according to claim 1, wherein the RTD sensor is mounted to an exterior face of one of the dielectric layers.

3. The PTC heater apparatus according to claim 2, further comprising an insulating layer disposed about the RTD sensor at the exterior face of the one of the dielectric layers.

4. The PTC heater apparatus according to claim 1, wherein:
   the PTC heater is maintained at an initial temperature and powered on at that initial temperature,
   a temperature of the PTC heater increases once the PTC heater is powered on, and
   a signal from the RTD sensor triggers a timer in the controller logic unit to begin timing an RTD sensing duration of a predefined length of time once the temperature of the PTC heater increases beyond a predefined threshold temperature range.

5. The PTC heater apparatus according to claim 4, wherein:
   the controller logic unit establishes a predefined range of temperatures, and
   the controller logic unit indicates that the PTC heater is faulty in an event the readings of the RTD sensor indicate that a temperature of the PTC heater is outside the predefined range of temperatures and the timer indicates that the predefined length of time passed.

6. The PTC heater apparatus according to claim 1, wherein the controller logic unit comprises:
   a resistive network filter, which is receptive of a voltage supply and the readings of the RTD sensor, and which outputs a differential signal corresponding to a change in temperature of the PTC heater;
   a difference amplifier, which is receptive of a voltage supply, and which amplifies the differential signal of the resistive network filter; and
   a multiplexer with an astable timer, which is receptive of multiple signals from the difference amplifier, and which is configured to select one of the multiple signals for analysis by the controller logic unit.

7. A positive temperature coefficient (PTC) heater apparatus, comprising:
a PTC heater;
multiple resistance temperature detector (RTD) sensors, each of which is mounted to the PTC heater; and
a controller logic unit electrically connected to each of the multiple RTD sensors to receive readings of each of the multiple RTD sensors, which, when the PTC heater is powered on, respectively indicate whether the PTC heater is faulty,
wherein the PTC heater comprises:
dielectric layers;
a first conducting trace comprising a first conducting trace portion interposed between the dielectric layers;
a second conducting trace comprising a second conducting trace portion interposed between the dielectric layers; and
PTC heating patches, each being electrically connected between the first and second conducting trace portions and interposed between the dielectric layers.

8. The PTC heater apparatus according to claim 7, wherein each of the multiple RTD sensors is mounted to an exterior face of one of the dielectric layers.

9. The PTC heater apparatus according to claim 8, further comprising an insulating layer disposed about each of the multiple RTD sensors at the exterior face of the one of the dielectric layers.

10. The PTC heater apparatus according to claim 7, wherein:
the PTC heater is maintained at an initial temperature and powered on at that initial temperature,
a temperature of the PTC heater increases once the PTC heater is powered on, and
a signal from any one of the multiple RTD sensors triggers a timer in the controller logic unit to begin timing an RTD sensing duration of a predefined length of time once the temperature of the PTC heater increases beyond a predefined threshold temperature range.

11. The PTC heater apparatus according to claim 10, wherein:
the controller logic unit establishes a predefined range of temperatures, and
the controller logic unit indicates that the PTC heater is faulty in an event the readings of any one of the multiple RTD sensors indicate that a temperature of the PTC heater is outside the predefined range of temperatures and the timer indicates that the predefined length of time passed.

12. The PTC heater apparatus according to claim 7, wherein the controller logic unit comprises:
multiple resistive network filters, each of which is receptive of a voltage supply and the readings of a corresponding one of the multiple RTD sensors, and each of which outputs a differential signal corresponding to a change in temperature of the PTC heater;
multiple difference amplifiers, each of which is receptive of a voltage supply, and each of which amplifies the differential signal of a corresponding one of the multiple resistive network filters; and
multiple multiplexers with astable timers, each of which is receptive of multiple signals from a corresponding one of the multiple difference amplifiers, and each of which is configured to select one of the multiple signals for analysis by the controller logic unit.

* * * * *